United States Patent Office 3,651,104
Patented Mar. 21, 1972

3,651,104
α,β-UNSATURATED QUATERNARY ALKYLATED FATTY ACIDS AND ESTERS USEFUL FOR INSECT CONTROL
John B. Siddall, Palo Alto, Calif., assignor to Zoecon Corporation, Palo Alto, Calif.
No Drawing. Continuation-in-part of application Ser. No. 854,778, Sept. 2, 1969. This application Oct. 27, 1969, Ser. No. 869,855
Int. Cl. C07c 69/52; A01n 9/24
U.S. Cl. 260—410.9 R     13 Claims

ABSTRACT OF THE DISCLOSURE

Methods employing and compositions comprising a quaternary alkylated aliphatic hydrocarbon amide or ester and derivatives thereof for the control of insects.

---

This is a continuation in-part of application Ser. No. 854,778, filed Sept. 2, 1969.

This invention relates to methods and compositions for the control of insects and to novel quaternary alkylated compounds of Formula A:

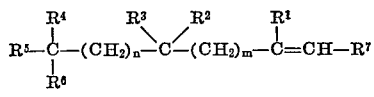

(A)

wherein, $m$ is an interger of one to six;
$n$ is an integer of two to six;
$R^2$ is hydrogen or alkyl;
each of $R^1$, $R^3$, $R^4$, $R^5$ and $R^6$ is alkyl;
$R^7$ is the group —$CH_2$—$R^8$,

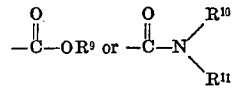

in which, $R^8$ is hydroxy and esters and ethers thereof;
$R^9$ is hydrogen, alkyl, cycloalkyl, aralkyl or a metal; and each of $R^{10}$ and $R^{11}$ is hydrogen, alkyl, cycloalkyl, hydroxyalkyl, alkoxyalkyl, alkenyl, phenyl, or, when taken together with the nitrogen atom to which they are attached, pyrrolidino, morpholino, piperidino, piperazino or 4-alkylpiperazino, provided that:
when $R^7$ is the group

$R^1$ is methyl, $R^3$ is alkyl of one to four carbon atoms, each of $R^4$, $R^5$ and $R^6$ is methyl, $m$ is the integer two or three and $n$ is the integer two or three—then $R^2$ is alkyl.

The term "alkyl," as used herein, refers to a straight or branched chain saturated aliphatic hydrocarbon group having a chain length of one to twelve carbon atoms such as methyl, ethyl, n-propyl, i-propyl, n-butyl, n-hexyl, n-amyl, n-heptyl, n-octyl, n-nonyl, lauryl, n-decyl, t-amyl, 3-ethylpentyl and 2-methylhexyl. The term "hydroxyalkyl," as used herein, refers to an alkyl group substituted with one hydroxy group, e.g. hydroxymethyl, p-hydroxyethyl and 4-hydroxypentyl, The term "alkoxyalkyl," as used h erein, refers to an alkyl group substituted with one alkoxy group, e.g. methoxymethyl, 2-methoxyethyl, 4-ethoxybutyl, n-propoxyethyl and t-butoxyethyl. The term "alkenyl," as used herein, refers to an ethylenically unsaturated hydrocarbon group, branched or straight chain, having a chain length of two to twelve carbon atoms, e.g. allyl, vinyl, 3-butenyl, 2-butenyl, 2-hexenyl and i-propenyl. Whenver the foregoing terms are modified by the word "lower," the chain length of the group is not more than six carbon atoms with the exception of lower alkoxyalkyl in which a total chain length of twelve carbon atoms is the maximum.

The term "cycloalkyl," as used herein, refers to a cycloalkyl group of four to eight carbon atoms, i.e. cyclobutyl, cyclopentyl, cyclohexyl, cycloheptyl and cyclooctyl.

The term "aralkyl," as used herein, refers to an aralkyl group of seven to twelve carbon atoms, such as benzyl, phenylethyl, methylbenzyl and naphthylmethyl.

The term "metal," as used herein, refers to lithium, sodium, potassium, calcium, strontium, copper, manganese and zinc.

The term "hydroxy and esters and ethers thereof," as used herein, refers to free hydroxyl and esters and ethers which are hydrolyzable to free hydroxyl. Typical esters are carboxylic esters of up to twelve carbon atoms which are saturated or unsaturated and of straight chain aliphatic, branched chain aliphatic, and cyclic or cyclic aliphatic structure, such as acetate, propionate, butyrate, valerate, caproate, enanthate, pelargonate, acrylate, undecanoate, phenoxyacetate, benzoate, phenylacetate, diethylacetate, trimethylacetate, trichloroacetate, t-butylacetate, trimethylhexanoate, methylneopentylacetate, cyclohexylacetate, cyclopentylpropionate, adamantoate, methoxyacetate, acetoxyacetate, aminoacetate, diethylaminoacetate, β-chloropropionate, 2-chloro-4-nitrobenzoate, piperidinoacetate, and the like, preferably a lower hydrocarbon carboxylic ester containing up to six carbon atoms. Typical ethers are formed by etherification of the hydroxy group by tetrahydrofuran-2-yl, tetrahydropyran-2-yl or by a monovalent hydrocarbon group of up to eight carbon atoms which can be of straight, branched, cyclic or cyclic aliphatic structure, such as alkyl, alkenyl, cycloalkyl or aralkyl, e.g. methyl, ethyl, propyl, butyl, pentyl, butenyl, phenethyl, benzyl, cyclopentyl, cyclohexyl, and the like.

The present invention provides a novel method for the control of insects which comprises treating the insects with an effective amount of a compound of Formula A. To aid in achieving uniform and economical application, it is advantageous to employ a composition comprising an inert carrier and a compound of Formula A. These compositions can be either liquid or solid. The exact formulation employed will vary according to factors such as the specie of insect to be treated, the stage of the insect's life at time of treatment, the degree or extent of insect infestation, environmental conditions and type of application. The most advantageous formulation (composition) for the control of a specific insect is determinable by those of ordinary skill in the art by routine experimentation giving due consideration to the foregoing factors and the description herein.

The formulation employed is also dependent upon the primary mode or mechanism of treating the insects—that is, topical application (absorption), per oral application (ingestion), chemosterilant (sterility) or vaporization (inhalation). The primary mode of treating insects is, in turn, dependent on whether the insect is a chewing insect, a sucking insect or flying insect, whether the control of the insect is sought at the embryo, larvae, pupae or adult stage, and the locus of the insect.

Formulation can be prepared by incorporating a compound of Formula A with a solid inert carrier, such as finely divided talc, silica, pyrophyllite or clay or granular inert carriers, such as the vermiculites or a liquid inert carrier, such as acetone, xylene, peanut oil, cottonseed oil, sesame oil and other vegetable and mineral oils conventionally employed as carriers in formulations for insect control. Other components can be included, such as emulsifying agents, wetting agents and dispersing agents. Generally, the formulation will contain less than 95% by weight of the compound and more frequently less than 25%. Depending upon the particular insect being treated and the particular stage of the life cycle at the time of treatment, control of insects by treating the insects with a compound of Formula A is accomplished by the compound's ability to: inhibit metamorphosis; act as a direct insecticide, particularly at the embryo stage; act as a chemosterilant; or break the diapause of the insect.

Treatment of insects by vapor action can be accomplished by formulating a compound of Formula A with a resinous material, such as the vinyl polymers, e.g. polyvinyl chloride. This method is particularly useful for flying insects and treating enclosed areas. Suitable formulating methods and carriers are described in U.S. Pat. 3,318,769, for example.

Although not intending to be limited by a theoretical explanation, it appears that the effectiveness of the compounds of Formula A can be traced to their ability to mimic the activity of juvenile hormone substances. Juvenile hormone was identified as methyl 10,11-oxido-7-ethyl-3,11-trimethyltrideca-2,6-dienoate using an extract of cecropia moths by Roeller et al., Angew Chem. Internat. Edit. 6, 179 (1967) and Chemical & Engineering News, 48–49 (Apr. 10, 1967). A second juvenile hormone from the same source has been identified as methyl 10,11-oxido-3,7,1-trimethyltrideca - 2,6 - dienoate by Meyer et al. "The Two Juvenile Hormones from the Cecropia Silk Moth," Zoology (Proc. N.A.S.) 60, 853 (1968). In addition to the natural juvenile hormones, some synthetic terpenoids have been reported exhibiting maturation inhibiting, sterility or ovicidal activity. Bowers et al., Life Sciences (Oxford) 4, 2323 (1965); BioScience 18, No. 8, 791 (August 1968); Williams, Scientific American 217, No. 1, 13 (July, 1967); Science 154, 248 (Oct. 14, 1966); Romanuk et al., Proc. Nat. Acad. Sci. 57, 349 (1967); Masner et al., Nature 219, 395 (July 27, 1968); and U.S. Pats. 3,429,970 and 3,453, 362.

In the application of the compounds of Formula A it is more economical and expedient to use a mixture of the cis and trans isomers to avoid separation processing. As individual isomers, the trans isomer is preferably employed for the control of insects.

Typical insects which can be controlled by treatment with a compound of Formula A in accordance with the present invention are *Dysdercus cingulatus, Tenebrio molitor, Galleria mellonella, Tribolium confusm, Periplaneta americana, Hypera puctata* (clover leaf weevil), *Dysdercus suturellus, Aphididae,* such as melon aphid and cabbage aphid, *Tinea pellionella, Sitophilus granarius, Lygus hesperus* and *Schistocerca vaga*.

In the description following, each of $n$, $m$, $R^1$, $R^2$, $R^3$, $R^4$, $R^5$, $R^6$, $R^7$, $R^8$, $R^9$, $R^{10}$ and $R^{11}$ is as defined hereinabove.

The compounds of Formula A can be prepared according to the transformation outlined below:

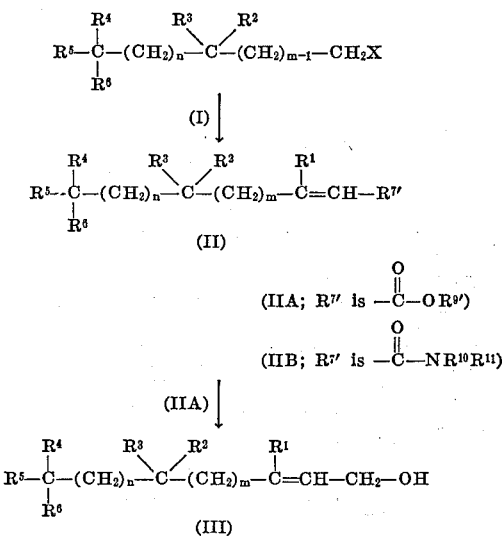

wherein X is bromo or chloro and $R^{9'}$ is alkyl, cycloalkyl or aralkyl.

The conversion of I to II (A and B) is accomplished by alkylation of the $\alpha,\beta$-acetylenic ester and amide I'

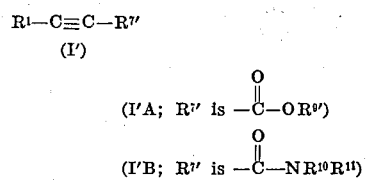

using the procedure of Siddall et al., Journal of the American Chemical Society 91, 1853–4 (1969). This procedure involves forming a Grignard reagent of I, preferably wherein X is bromo; forming the corresponding organo-copper reagent by reaction of the Grignard with a cuprous salt, such as cuprous iodide or bromide in the presence of a solubilizing ligand such as a tertiary amine, tertiary phosphine or tertiary phosphite, preferably a tertiary amine, such as pyrrolidine, piperadine, pyridine or trialkylamine; and reacting the organo-copper reagent with the acetylenic ester or amide (I').

The acetylenic esters and amides (I') are commercially available or can be prepared in the laboratory using known methods, such as those described by Raphael et al., J. Chem. Soc. 115 and 120 (1950); Johnson, A.W., "The Chemistry of the Acetylenic Compounds," vol. II, London (1950); and R. A. Raphael, "Acetylenic Compounds in Organic Synthesis," Butterworth and Co., London (1955). Typical of the esters and amides (I') are methyl 2-butynoate, ethyl 2-butynoate, ethyl 2-pentynoate, methyl 2-hexynoate, propyl 2-butynoate, ethyl 2-hexynoate, ethyl 2-octynoate, methyl 2-decynoate, 2-butynamide, N,N-diethyl 2-butynamide, N-ethyl 2-butynamide, N,N-dimethyl 2-pentynamide, N,N-diethyl 2-pentynamide, N,N-di-(n-propyl) 2-butynamide, N,N-diethyl 2-hexynamide, 2-octynamide, and the like.

A compound of Formula IIA, preferably wherein $R^{9'}$ is lower alkyl, upon reduction with sodium borohydride, lithium aluminum hydride, or the like, affords the C-1 alcohols (III).

The requisite halide (I) is prepared according to methods outlined below and the examples hereinafter.

Compounds of Formula I in which $n$ is the integer two are prepared using intermediate IX which is prepared as follows:

Outline B

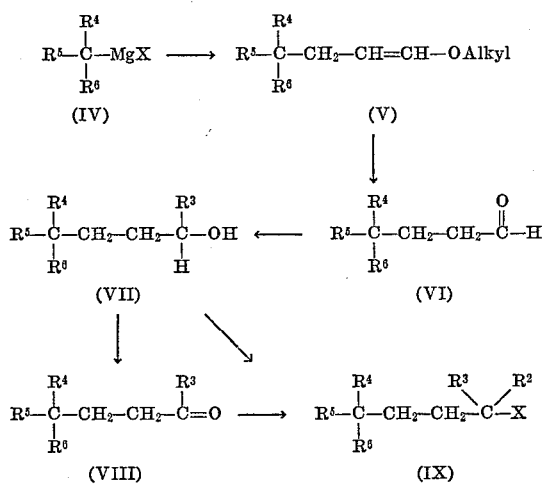

The Grignard (IV) is prepared in the usual manner from a tertiary halide and magnesium in ether solvents or ether/hydrocarbon solvents. Tertiary halides are described in U.S. 2,689,873 or can be prepared by halogenation of tertiary alcohols prepared according to known procedures, such as the reaction of a ketone with Grignard—see Kharasch et al., "Grignard Reactions of Nonmetallic Substances," Prentice-Hall, Inc., N.Y. (1954).

The Grignard (IV) is reacted with acrolein dialkyl acetal in ether solvent or ether/hydrocarbon solvent, such as ether, tetrahydrofuran or ether/toluene, at a temperature of about 50 C.–90° C. to yield V which on treatment with aqueous acid, e.g., aqueous sulfuric acid with heat, affords the aldehyde (VI). By use of the Grignard ($R^3MgX$) or alkyl lithium ($R^3Li$), the aldehyde (VI) is converted into the secondary alcohol (VII) which is oxidized using Jones reagent, or the like, to yield the ketone (VIII). By reaction with Grignard ($R^2MgX$) followed by treatment with concentrated HCl or HBr, the ketone (VIII) is converted into the tertiary halide (IX) to obtain compounds of Formula IX wherein $R^2$ is hydrogen, the alcohol (VII) is treated with phosphorus tribromide, phosphorus trichloride, or the like.

Compounds of Formula I in which $n'$ is the integer three to six are prepared using the intermediate (XIII) which is obtained as follows:

Outline C

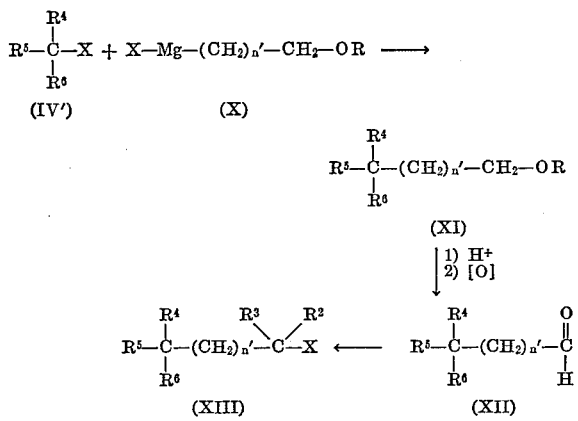

In the above reaction sequence, the tertiary halide (IV') is reacted with X wherein R is an acid hydrolyzable protecting group, such as t-butyl, tetrahydropyran-2-yl, tetrahydrofuran-2-yl or benzyl, and $n'$ is the integer three, four, five or six to obtain the ether (XI) which is hydrolyzed to the free alcohol followed by oxidation using chromium trioxide (Sarett oxidation), or the like, to furnish the aldehyde (XII). The aldehyde (XII) is then converted into the tertiary halide (XIII) using the reaction sequence VI–VII–VIII–IX described hereinabove to obtain XIII wherein both $R^2$ and $R^3$ are alkyl. To obtain the secondary halide (XIII) wherein $R^2$ is hydrogen, XII is treated according to the reaction sequence VI–VII–IX described above.

The compound (X) is obtained by etherification of $X$—$(CH_2)_{n'}$—$CH_2$—$OH$ (X is bromo or chloro) followed by reaction with magnesium in an ether solvent, such as ether, tetrahydrofuran, or the like.

By the procedure of Outlines B and C, the intermediates XIV are obtained:

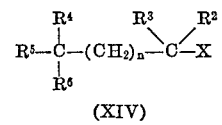

which are used to prepare the primary bromides and chlorides (I).

A general method for preparing I from XIV is that of Outline D:

Outline D

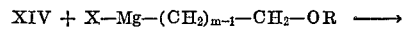
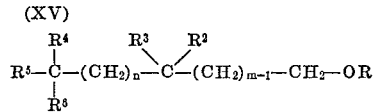

In the reaction sequence of Outline D, a secondary or tertiary halide (XIV) is reacted with XV to furnish the primary ether (XVI) which is hydrolyzed with aqueous acid to the free hydroxy derivative followed by treatment with phosphorus tribromide or phosphorus trichloride in ether or other inert solvent to yield I.

Another method for preparing compounds of Formula I wherein $m$ is the integer two is to prepare a Grignard of XIV which is reacted with ethylene oxide to yield XVI ($m$ is two, R is hydrogen) which is then treated with phosphorus tribromide or phosphorus trichloride to yield I in which $m$ is two and X is bromo or chloro.

Another method for preparing compounds of Formula I in which $m$ is three is to form a Grignard of XIV which reacted with acrolein dialkyl acetal yields XVII:

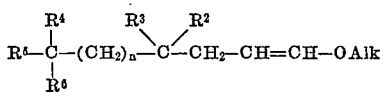

A compound of Formula XVII is then treated with aqueous acid to yield the aldehyde which is reduced using sodium borohydride, or the like, to the primary alcohol. The primary alcohol is then treated with phosphorus tribromide or trichloride to yield I in which $m$ is three and X is bromo or chloro.

In addition to the utility of the compounds of Formula A for the control of insects, the compounds of Formula A with the exception of the acid salts are useful lubricants for plastic and metal surfaces; plasticizers for hydrocarbon polymers, such as SBR, ABS, polypropylene, polyethylene and rubber; and vinyl polymers, such as polyvinylchloride; and as antistatic agents, particularly the amides.

The following examples set forth procedures for the preparation of the compounds of this invention and illustrate the present invention. Temperature in degrees centigrade.

EXAMPLE 1

(A) Three g. of t-butyl chloride is added to 9.6 g. of magnesium in 20 ml. of ether. After the initial reaction (started by addition of a crystal of iodine) begins to subside, a solution of 34 g. of t-butyl chloride in 180 ml. of ether is added while maintaining reflux.

To the resultant Grignard reagent is added 70 ml. of dry toluene and the ether removed by distillation. Twenty-six g. of acrolein diethyl acetal is added dropwise with stirring and the mixture maintained at about 83–85° for 90 minutes. The mixture is cooled in an ice bath to about 0° and saturated aqueous solution of ammonium chloride added with stirring until reaction subsides. The organic material is separated and the aqueous layer is extracted with ether (3×100). The ethereal extracts and organic material are combined, washed with water and brine, dried over magnesium sulfate and concentrated by evaporation. The residual concentrate is mixed with 25 ml. of water, 25 ml. of acetone and 10 drops of concentrated sulfuric acid added. The mixture is heated at reflux for two hours, then cooled and poured into 250 ml. of saturated sodium chloride solution. The organic layer is separated and the aqueous layer extracted with ether (5× 30). The combined organic layer and ether extracts are dried over magnesium sulfate and the solvent is evaporated to give 4,4-dimethylpentan-1-al which is purified by distillation.

(B) Eighty ml. of a 3 M solution of methylmagnesium bromide in ether is added over 30 minutes to 23 g. of 4,4-dimethylpentan-1-al in 250 ml. of dry ether. The mixture is heated at reflux for an hour, cooled to 0° and treated with saturated aqueous ammonium chloride until reaction subsides. The organic layer is separated and the aqueous layer extracted with ether (4× 60). The organic layer and ether extracts are combined, washed with water, washed with brine and dried over magnesium sulfate. Evaporation of the solvent gives 5,5-dimethylhexan-2-ol which is purified by distillation.

(C) A solution of 36 g. of 5,5-dimethylhexan-2-ol in 250 ml. of methylene chloride is cooled to 10° as a solution of 46.4 g. of sodium dichromate in 125 ml. of water is added. The mixture is maintained at 10° as a solution of 46.3 g. of sulfuric acid in 100 ml. of water is added over 45 minutes. The mixture is allowed to attain room temperature and, after three hours, the organic layer is separated and the aqueous layer is extracted with methylene chloride (3× 40). The combined organic materials are washed, in turn, with two 100 ml. portions saturated potassium bicarbonate, 100 ml. portions saturated potassium bicarbonate, 100 ml. water and 100 ml. of saturated sodium chloride solution and dried over magnesium sulfate. The solvents are evaporated to yield 5,5-dimethylhexan-2-one which is purified by distillation.

(D) Eighty ml. of 3 M solution of ethylmagnesium bromide in either is added over 30 minutes to 25.6 g. of 5,5-dimethylhexan-2-one in 250 ml. of dry ether. The mixture is heated at reflux for an hour after the addition, then cooled to 0° and treated with a saturated solution of ammonium chloride until further addition produces no reaction. The organic layer is separated and the aqueous layer is extracted with ether (4× 60). The combined organic materials is washed with 100 ml. of water, 100 ml. of brine and then dried over magnesium sulfate. Evaporation of the solvent yields 3,6,6-trimethylheptan-3-ol which is purified by distillation.

(E) Twenty g. of 3,6,6-trimethylheptan-3-ol is shaken with 60 ml. of concentrated hydrochloric acid for an hour. The acid layer is removed and the organic layer diluted with 30 ml. of ether and washed with 25 ml. of 5% aqueous sodium bicarbonate solution, with 20 ml. of water and dried over anhydrous calcium chloride. The ether is evaporated to yield 3- chloro-3,6,6-trimethylheptane which is puried by distillation.

The procedure of Part D is repeated by using methylmagnesium bromide to give 2,5,5-trimethylhexan-2-ol which is converted into 2-chloro-2,5,5-trimethylhexane using the procedure of Part E.

EXAMPLE 2

(A) A mixture of 0.5 moles of 3-bromopropanol, 1.5 moles of isobutene, about 0.3 ml. of concentrated sulfuric acid and 50 ml. of methylene chloride is stirred at —10° to 0° for about 24 hours. The cold reaction mixture is poured into cold aqueous sodium bicarbonate with stirring and separated. The organic phase is washed with water and aqueous potassium bicarbonate solution and dried over magnesium sulfate. The solvent is removed by evaporation to yield 3-bromo-1-(t-butoxy)propane which is purified by distillation.

Two g. of 3-bromo-1-(t-butoxy)propane is added to 10 g. of magnesium in 30 ml. of ether. After the initial reaction (started by addition of a crystal of iodine), a solution of 64 g. of 3-bromo-1-(t-butoxy)propane in 170 ml. of ether is added while maintaining reflux. To the resulting Grignard reagent is added 100 ml. of dry toluene and the ether removed by evaporation. Thirty-five g. of 3-chloro-3,6,6-trimethylheptane is added dropwise with stirring and then heated at 90° with stirring for two hours. The mixture is cooled and saturated ammonium chloride added with stirring until reaction subsides. The organic material is separated and the aqueous layer extracted with ether. The organic materials are combined, washed with water and brine, dried over magnesium sulfate and concentrated by evaporation. The concentrate is mixed with 30 ml. of water, 80 ml. of ethanol and 1 ml. of concentrated sulfuric acid. The mixture is heated at reflux for two hours and then cooled and poured into saturated sodium chloride solution. The organic layer is separated and the aqueous layer extracted with ether. The organic materials are combined, washed with water, dried over magnesium sulfate and the solvent evaporated to yield 4-ethyl-4,7,7-trimethyloctan-1-ol which is purified by distillation.

(B) To a mixture of 10 g. of 4-ethyl-4,7,7-trimethyloctan-1-ol and 30 ml. of ether at 0° is added a solution of 8 ml. of phosphorus tribromide in 25 ml. of ether slowly. The mixture is stirred at 0° for about two hours and then heated at 30° for two hours. The mixture is cooled, washed with water, dried over magnesium sulfate and evaporated to yield 1-bromo-4-ethyl-4,7,7-trimethyloctane which is purified by distillation.

(C) Two g. of 1-bromo-4-ethyl-4,7,7-trimethyloctane is added to 3 g. of magnesium in 25 ml. of ether. After the initial reaction, a solution of 24 g. of 1-bromo-4-ethyl-4,7,7-trimethyloctane in 50 ml. of ether is added while maintaining reflux.

To a mixture of 38 g. of cuprous iodide and 21 g. of pyrrolidine in 100 ml. of dry ether at —80° under argon atmosphere is added with stirring the above-prepared Grignard reagent. The mixture is stirred for an additional two hours and then 10 g. of methyl 2-butynoate in ether is added with stirring while maintaining the temperature at about —80°. After an additional 30 minutes, 10 ml. of water is injected and the mixture allowed to attain ice-temperature. After addition of diatomaceous earth, the mixture is filtered, washed with saturated ammonium chloride solution and dried over sodium sulfate. After removal of solvent under reduced pressure, there is obtained methyl 7-ethyl-3,7,10,10-tetramethylundec-2-enoate which is purified by distillation.

EXAMPLE 3

4-bromo-1-(t-butoxy)butane is prepared from 4-bromobutan-1-ol and isobutene using the procedure of Example 2.

Two g. of 4-bromo-1-(t-butoxy)butane is added to 10 g. of magnesium in 35 ml. of ether. After the initial reaction subsides, a solution of 66 g. of 4-bromo-1-(t-butoxy)-butane in 180 ml. of ether is added while maintaining reflux.

To the above Grignard reagent is added 100 ml. of dry toluene and the ether removed by distillation. Twenty-seven g. of t-butyl chloride is added dropwise with stirring and the mixture heated at about 90° for two hours. The mixture is cooled in an ice bath to about 0° and saturated aqueous ammonium chloride added until reaction subsides. The organic layer is separated and the aqueous layer extracted with ether. The organic materials are combined, washed with water and brine, dried over magnesium sulfate and evaporated to yield the t-butyl ether of 5,5-dimethylhexan-1-ol which is hydrolyzed to the free alcohol using the procedure of Example 2 or by stirring with trifluoroacetic acid.

Five g. of 5,5-dimethylhexan-1-ol in 50 ml. of dry pyridine is added to a mixture of chromic acid (5 g.) in pyridine (50 ml.) with stirring. After two hours, isopropanol (10 ml.) is added and after a further 30 minutes, the mixture is diluted with 0.5% aqueous potassium hydroxide solution and extracted with ether. The ethereal extracts are washed, dried and evaporated to yield 5,5-dimethylhexan-1-al. This aldehyde is reacted with methylmagnesium bromide to give 6,6 - dimethylheptan - 2 - ol which is oxidized to 6,6-dimethylheptan-2-one using the procedure of Example 1 (B and C). This ketone is reacted with methylmagnesium bromide to give 2,6,6-trimethylheptan-2-ol which is converted into 2-chloro-2,6,6-trimethylheptane by the procedure of Example 1 (D and E).

The procedure of Example 2 (A, B and C) is followed using 2-chloro-2,6,6-trimethylheptane as the starting material in place of 3-chloro-3,6,6-trimethylheptane to give methyl 3,7,7,11,11-pentamethyldodec-2-enoate.

EXAMPLE 4

Three g. of 2-chloro-2,6,6-trimethylheptane is added to 9.6 g. of magnesium in 25 ml. of ether. After the initial reaction begins to subside, a solution of 65 g. of 2-chloro-2,6,6-trimethylheptane in 185 ml. of ether is added while maintaining reflux. To the resultant Grignard reagent is added 100 ml. of dry toluene and the ether removed by distillation. Twenty-six g. of acrolein diethyl acetal is added dropwise with stirring and the mixture heated at about 90° for 1.5 hours. The mixture is cooled and saturated aqueous ammonium chloride added until no further reaction. The organic material is separated and the aqueous layer extracted with ether. The combined organic materials are washed with water and brine, dried over magnesium sulfate and concentrated by evaporation. The residual concentrate is mixed with 30 ml. of water, 80 ml. of acetone and 10 drops of concentrated sulfuric acid added. The mixture is heated at reflux for two hours, then cooled and poured into saturated sodium chloride solution. The organic layer is separated and the aqueous layer extracted with ether. The combined organic materials are dried over magnesium sulfate and then the solvent removed by evaporation to give 4,4,8,8-tetramethylnonan-1-al which is purified by distillation.

Six g. of 4,4,8,8-tetramethylnonan-1-al is added to a mixture of 2.4 g. of sodium borohydride, 100 ml. of methanol and 5 ml. of 2 N sodium hydroxide and the resulting mixture allowed to stand at room temperature for about two hours. The mixture is then poured into water and extracted with methylene chloride. The extracts are combined, washed with aqueous sodium bicarbonate and then brine, dried over magnesium sulfate and evaporated to yield 4,4,8,8-tetramethylnonan-1-ol which is purified by distillation and converted into the corresponding bromide (i.e. 1-bromo - 4,4,8,8 - tetramethylnonane) using the procedure of Example 2 (B).

Two g. of 1-bromo-4,4,8,8-tetramethylnonane is added to 2.5 g. of magnesium in 20 ml. of ether. After the initial reaction, a solution of 24.2 g. of 1-bromo-4,4,8,8-tetramethylnonane in 40 ml. of ether is added while maintaining reflux.

To a mixture of 19 g. of cuprous iodide and 20 g. of tetramethylethylenediamine in 80 ml. of dry ether at −78° under argon atmosphere is added with stirring the above-prepared Grignard reagent. The mixture is stirred for an additional two hours and then 11.2 g. of ethyl but-2-ynoate in ether is added with stirring while maintaining the temperature at −78°. After an additional 30 minutes, 10 ml. of water is injected and the mixture allowed to attain ice-temperature. After addition of diatomaceous earth, the mixture is filtered, washed with saturated ammonium chloride solution and dried over sodium sulfate. After removal of solvent under reduced pressure, there is obtained ethyl 3,7,7,11,11-pentamethyldodec-2-enoate which can be purified by distillation.

By using each of N,N-diethyl but-2-ynamide and methyl pent-2-ynoate in the foregoing procedure in place of ethyl but-2-ynoate, there is obtained N,N-diethyl 3,7,7,11,11-pentamethyldodec - 2 - enamide and methyl 3-ethyl - 7,7,11,11 - tetramethyldodec-2-enoate, respectively. Similarly, the use of pyrrolidyl but-2-ynamide as the acetylenic reagent yields pyrrolidyl 3,7,7,11,11-pentamethyldodec-2-enamide.

(A) Ether (20 ml.) is added to 9.6 g. of magnesium and a crystal of iodine. Five ml. of t-butyl chloride is added to begin the reaction and then t-butyl chloride (37 g.) in ether (200 ml.) is added dropwise over about five hours. After addition is complete, the mixture is heated under reflux for about 30 minutes and then allowed to stand overnight in a refrigerator.

(B) To the Grignard prepared in Part A is added 70 ml. of dry toluene and the resulting mixture heated at 90°. When no more ether distills off, 26 g. of acrolein diethyl acetal is added dropwise over 15 minutes with stirring. The temperature is then maintained at about 83–85° for 1.5 hours. The mixture is cooled in an ice-bath and saturated ammonium chloride solution added with stirring until reaction subsides. The mixture is then extracted with ether. The ether extracts are combined, washed with water and brine, dried over magnesium sulfate and concentrated by evaporation. The concentrate is heated with 10 ml. of water, 20 ml. of acetone and four drops of concentrated sulfuric acid under reflux for about two hours. The mixture is cooled and poured into brine, separated and the water-layer re-extracted with ether. The ether extracts are combined, dried and evaporated to yield 4,4-dimethylpentan-1-al which can be purified by distillation.

(C) Eight g. of 4,4-dimethylpentan-1-al is added to a mixture of 2.5 g. of sodium borohydride, 100 ml. of methanol and 5 ml. of 2 N sodium hydroxide and the resulting mixture allowed to stand at room temperature for two hours. The mixture is then poured into water and extracted with methylene chloride. These extracts are combined, washed with aqueous sodium bicarbonate and then brine, dried over magnesium sulfate and evaporated to yield 4,4-dimethylpentan-1-ol which can be purified by distillation or chromatography.

To a mixture of 11 g. of 4,4-dimethylpentan-1-ol and 25 ml. of benzene at 0° is added a solution of 4 ml. of phosphorus tribromide in 18 ml. of benzene over 15 minutes. The mixture is stirred at 0° for one hour and then heated at 60–65° for three hours. The mixture is then poured onto ice and extracted with pentane. The extracts are combined, washed with aqueous sodium bicarbonate, water and then brine, dried and evaporated to yield 4,4-dimethylpentylbromide (1-bromo-4,4-dimethylpentane) which can be purified by distillation.

(D) The bromide (1-bromo - 4,4 - dimethylpentane) (5.39 g.) is converted into the Grignard reagent using magnesium (0.8 g.) and dry ether (50 ml.).

The above Grignard reagent is added by syringe to a suspension, at 0°, of cuprous iodide (5 g.) in ether (150 ml.). This mixture is allowed to stand at 0° for 20 minutes and then 3 g. of mesityl oxide in 10 ml. of ether is added. After 45 minutes, the mixture is poured into 300 ml. of 10% aqueous ammonium chloride solution. The resulting mixture is extracted with ether, the ethereal extracts are combined, washed with water and brine and dried over magnesium sulfate. The solvent is removed through a Vigreux column leaving an oil containing 4,4,8,8-tetramethylnonan-2-one. The oil is taken up in ether and distilled at 15 mm. pressure, collecting the higher boiling fractions (90–110°) which are percolated through a short column of alumina with hexane. The hexane is evaporated from the elute and the residue distilled to give 4,4,8,8-tetramethylnonan-2-one, B.P. 91–92°/1 mm.

The above procedure is repeated using 14.6 g. of 4,4-dimethylpentyl bromide, 2 g. of magnesium, 13 g. of cuprous iodide and 8.1 g. of mesityl oxide to yield additional 4,4,8,8-tetramethylnonan-2-one.

(E) Twelve g. of 4,4,8,8-tetramethylnonan-2-one is added to a solution of 3.5 g. of sodium borohydride, 120 ml. of methanol and 7 ml. of 2 N sodium hydroxide solution. After two hours, acetic acid is added to destroy excess sodium borohydride and the solution poured into water (250 ml.) and extracted with ether (6× 60). The extracts are combined, washed with aqueous potassium bicarbonate, water and brine and dried. The solvent is removed by evaporation and the residue distilled to give 4,4,8,8-tetramethylnonan-2-ol, B.P. 101–105°/1 mm.

To a solution of 4,4,8,8-tetramethylnonan-2-ol (9.8 g.) in 35 ml. of dry pyridine cooled to 0° is added a solution of 10 ml. of phopshorus oxychloride in 35 ml. of pyridine over 40 minutes in a nitrogen atmosphere. The mixture is stirred at room temperature for 16 hours and then at 100° for two hours. The mixture is cooled and poured into ice-water (600 ml.) which is then extracted with pentane (6× 60). The extracts are combined and washed with water, dilute HCl, water and brine and dried. The solvent is removed by evaporation and residue distilled to give 4,4,8,8-tetramethylnonene (mixture of 1-ene and 2-ene), B.P. 68–70°/3.5 mm. and 4,4,8,8-tetramethylnon-2-yl chloride, B.P. 98–100°/3.5 mm. The chloride (2.5 g.) is heated with 3 g. of diazabicyclononene at 110° under nitrogen for 18 hours. The mixture is cooled and poured onto a column of alumina which is eluted with pentane. The eluate is washed with dilute HCl and brine and dried. The solvent is evaporated and the residue distilled to give a mixture of 4,4,8,8-tetramethylnon-1-ene and -2-ene.

A solution of 6.06 g. of 4,4,8,8-tetramethylnonene (mixture of 1-ene and 2-ene) in 20 ml. of dry diglyme is treated with 12.2 ml. of 1 M solution of diborane in tetrahydrofuran. The mixture is stirred under nitrogen for 100 minutes. Ten ml. of diglyme is added and the tetrahydrofuran distilled off. The mixture is heated at reflux for four hours, cooled and 5 ml. of water added followed by 10 ml. of 3 N sodium hydroxide and then 7.5 ml. of 30% hydrogen peroxide added dropwise. On cooling, the mixture is poured into water and extracted with ether. The extracts are combined and washed with water and brine and dried. Evaporation of the solvent and distillation of the residue gives 4,4,8,8-tetramethylnonan-1-ol, B.P. 118–119°/2 mm.

A solution of 4,4,8,8-tetramethylnonan-1-ol (4.5 g.) in 8 ml. of dry benzene is treated, at 0°, with a solution of phosphorus tribromide (1 ml.) in 5 ml. of benzene. The mixture is maintained at 0° for 45 minutes and then at 60° for 3.5 hours. The mixture is cooled, poured onto ice and extracted with pentane. The extracts are percolated through alumina with pentane and the solvent removed from the eluate. The residue is distilled to yield 4,4,8,8-tetramethylnon-1-ylbromide, B.P. 109–111°/2 mm.

(F) To a suspension of 2.54 g. of cuprous iodide in 60 ml. of dry ether under argon is added 1.4 g. of pyrrolidine in 5 ml. of dry ether. The mixture is stirred for 30 minutes at room temperature and then cooled to −78°.

To this mixture is added 13.7 ml. of 0.5 molar 4,4,8,8-tetramethylnon-1-yl magnesium bromide in ether by syringe and the mixture stirred at −78° for 90 minutes after addition. To this mixture is added 0.7 g. of methyl butynoate in 5 ml. of ether while maintaining the temperature at −78°. After 30 minutes, 20 ml. of water is injected and the mixture warmed to room temperature. The ether layer is separated and the aqueous layer re-extracted with ether. The extracts are combined, washed with water and brine and dried. The solvent is evaporated and the residue applied to seven 1.3 mm. x 20 x 100 cm. HF plates which are eluted four times in hexane containing 2% ethyl acetate. Removal of the major (more polar) U.V. active band yields trans methyl 3,7,7,11,11-pentamethyldodec - 2-enoate, B.P. 110° (bath)/0.1 mm. Removal of the minor U.V. active band gives cis methyl 3,7,7,11,11 - pentamethyldodec-2-enoate, B.P. 105° (bath)/0.14 mm.

EXAMPLE 6

A solution of 52 g. of acrolein diethyl acetal in 400 ml. of dry ether is cooled in ice-water and treated, under argon, with 320 ml. of 1.24 M solution of t-butyl lithium in pentane. After addition is completed, the mixture is stirred for 90 minutes and then 40 ml. of saturated ammonium chloride is added cautiously followed by water (100 ml.). The organic layer is separated and the aqueous layer re-extracted with ether (2× 50). The organic materials are combined, washed with water and brine and dried. The solvent is distilled out through a short Vigreux column.

The residual liquid is heated under reflux with 50 ml. of water, 150 ml. of acetone and 15 drops of sulfuric acid. After two hours, the mixture is cooled and poured into brine. The organic layer is separated and the aqueous layer re-extracted with ether. The combined organic materials are washed with brine and dried. Evaporation of solvent gives 4,4-dimethylpentan-1-al which is purified by distillation.

The thus-obtained aldehyde is added to a solution of sodium borohydride (7.5 g.) in methanol (200 ml.) containing sodium hydroxide solution (aqueous, 2 N, 15 ml.) at 0°. After addition, the mixture is allowed to come to room temperature and left for 2.5 hours. The mixture is poured into water and extracted with ether (6× 80). The combined extracts are washed with dilute hydrochloric acid and with brine and dried. Evaporation of solvent and distillation of the residual oil gives 4,4-dimethylpentan-1-ol.

A solution of 20.6 g. of 4,4-dimethylpentan-1-ol in 50 ml. of dry benzene, at 0°, is treated with a solution of 8 ml. of phosphorus tribromide in 36 ml. of benzene. The mixture is stirred at 0° for 50 minutes after addition and then maintained at 60–65° for three hours. The mixture is cooled and poured onto ice. The benzene layer is separated and the aqueous layer re-extracted with pentane (5× 50). The combined extracts are washed with saturated sodium bicarbonate solution, water and brine and dried. The solvents are removed and distillation of the residue gives 4,4 - dimethylpent-1-ylbromide, B.P. 163–164°.

The thus-obtained bromide is treated as described in Example 5 (D, E and F) to afford methyl 3,7,7,11,11-pentamethyldodec-2-enoate.

EXAMPLE 7

To 16.8 g. of magnesium covered with dry ether, there is added 4 g. of 2-chloro-2,6,6-trimethylheptane in ether. After the reaction starts, the remainder of the chloride (84 g.) in ether is added over a period of about four hours. The Grignard reagent is cooled to about −5° and then 1.02 molar equivalents of ethylene oxide is distilled into the Grignard reagent (about one hour). The cooling means is then removed and the mixture left for one hour. One-third of the ether (about 150 ml.) is distilled off and then about 250 ml. of dry benzene is added. Solvent is removed until the distillation temperature is about 65° and the mixture refluxed at 65° for one hour. The mixture is cooled in an ice-salt bath (0°) and then ice cold 10% sulfuric acid is added. The mixture is stirred overnight allowing the reaction to warm slowly to room temperature.

The organic layer is separated and aqueous layer extracted with ether. The combined organic material is washed with 10% sodium hydroxide, water until neutral, then brine and dried over sodium sulfate. Solvent is removed to yield 3,3,7,7 - tetramethyloctan-1-ol which is purified by distillation and converted into 1-bromo-3,3,7,7-tetramethyloctane by treatment with phosphorus tribromide in benzene. The thus-obtained C-1 bromide is used as the starting material in the procedure of Example 5(F) to yield methyl 3,6,6,10,10 - pentamethylundec-2-enoate.

EXAMPLE 8

To 0.24 g. of sodium hydride in 10 ml. of tetrahydrofuran is added 2.24 g. of diethyl carbethoxymethylphosphonate in 10 ml. of tetrahydrofuran under nitrogen. The solution is stirred for one hour.

To 0.4 g. of 4,4,88 - tetramethylnonan-2-one in dry tetrahydrofuran, under nitrogen, is added 5 ml. of the above-prepared reagent. The mixture is stirred at room temperature for one hour and then heated under reflux for four hours, cooled, poured into water and extracted with ether. The ether extracts are washed, dried and solvent removed by evaporation to yield ethyl 3,5,5,9,9-pentamethyldec - 2-enoate, B.P. 91° (bath)/0.1 mm., separated by thin layer chromatography using ethyl acetate: hexane (2:100).

EXAMPLE 9

To 0.24 g. of sodium hydride in 10 ml. of tetrahydrofuran, under nitrogen, is added dropwise, N,N-diethyl diethoxyphosphonoacetamide (2.5 g.) in 10 ml. of tetrahydrofuran. After addition, the mixture is stirred for one hour at room temperature.

Five ml. of the above reagent is added to 0.4 g. of 4,4,8,8-tetramethylnonan-2-one in 5 ml. of tetrahydrofuran under nitrogen. After four hours, more of the above reagent (4 ml.) is added and the mixture stirred at room temperature overnight. The mixture is poured into brine and extracted with ether (5× 30). The extracts are washed with water and brine, dried over magnesium sulfate and the solvent evaporated to give diethyl 3,5,5,9,9 - pentamethyldec-2-enamide, B.P. 120°/0.11 mm., separated by thin layer chromatography using hexane:ethyl acetate (100:10).

EXAMPLE 10

A solution of 2 g. of methyl 3,7,7,11,11-pentamethyldodec-2-enoate in 20 ml. of dry ether is added with stirring to 0.4 g. of lithium aluminum hydride covered with ether at 0°. After about one hour, 2.5 ml. of acetic acid is added. The mixture is washed with ice water and the ether phase dried and evaporated to yield 3,7,7,11,11-pentamethyldodec-2-en-1-ol.

EXAMPLE 11

One g. of 3,7,7,11,11-pentamethydodec-2-en-1-ol in 8 ml. of pyridine and 2 ml. of triethylamine is treated with 1 ml. of acetyl chloride. The mixture is allowed to stand for 15 hours at about 25° and then poured into ice water and extracted with methylene chloride. The extracts are washed with water, dried over magnesium sulfate and evaporated to yield the acetate of 3,7,7,11,11-pentamethyldodec-2-en-1-ol.

Use of acid chlorides, such as trimethylacetyl chloride, benzoyl chloride, phenylacetyl chloride, propionyl chloride, and the like, affords the corresponding C-1 esters.

Alternatively, the esters are prepared by treatment of the C-1 alcohol with acid anhydride in pyridine, such as acetic anhydride, propionic anhydride, n-butyric anhydride, n-caproic anhydride, benzoic anhydride, and the like, at room temperature for about 14 hours.

EXAMPLE 12

(A) To one g. of 3,7,7,11,11-pentamethyldodec-2-en-1-ol in 20 ml. of dry ether is added one molar equivalent of diazoethane. One drop of boron/trifluoride is added and the mixture allowed to stand one hour at 0° and then at room temperature for two additional hours. The mixture is then washed with water and organic phase evaporated to yield the ethyl ether of 3,7,7,11,11-pentamethyldodec-2-en-1-ol.

The use of diazomethane and diazopropane in the foregoing procedure affords the methyl ether and propyl ether.

(B) One g. of 3,7,7,11,11-pentamethyldodec-2-en-1-ol in 10 ml. of diglyme is added dropwise to a slurry of 1 g. of sodium hydride in 10 ml. of diglyme under nitrogen. To this mixture is added 0.9 g. of 2-chlorotetrahydropyran. The reaction mixture is stirred at about 25° for 30 minutes and then quenched in ice water. The organic phase is separated and aqueous phase re-extracted with ether. The organic materials are washed with water, dried over sodium sulfate and evaporated to yield the tetrahydropyran-2-yl ether of 3,7,7,11,11-pentamethyldodec-2-en-1-ol.

By using 2-chlorotetrahydrofuran in the above procedure, the tetrahydrofuran-2-yl ether is obtained. Similarly, through the use of each of cyclohexyl chloride and cyclopentyl chloride in the foregoing procedure, the corresponding cyclohexyl ether and cyclopentyl ether are obtained.

EXAMPLE 13

Acrolein diethyl acetal is reacted with the Grignard of 2-chloro-2,5,5-trimethylhexane followed by treatment with acid using the procedure of Example 4 to obtain 4,4,7,7-tetramethyloctan-1-al which is reduced using sodium borohydride to 4,4,7,7-tetramethyloctan-1-ol which is converted into 1-bromo-4,4,7,7-tetramethyloctane using the procedure of Example 5 or 5C. The bromide is then, as the copper complex, reacted with ethyl but-2-ynoate using the procedure of Example 4 or 5F to yield ethyl 3,7,7,10,10 - pentamethylundec - 2 - enoate. By reacting 1-bromo-4,4,7,7-tetramethyloctane, as the copper complex, with each of methyl pent-2-ynoate and N,N-diethyl but-2-ynamide instead of ethyl but-2-ynoate, there is obtained methyl 3-ethyl-7,7,10,10 - tetramethylundec-2-enoate and N,N-diethyl 3,7,7,10,10-pentamethylundec-2-enamide.

EXAMPLE 14

The procedure of Examples 5A and B are repeated using t-amyl chloride to yield 4,4-dimethylhexan-1-al which is used in Example 5C to afford 1-bromo-4,4-dimethylhexane. The thus-obtained bromide is converted into 4,4,8,8-tetramethyldecan-2-one which is transformed into 1-bromo-4,4,8,8-tetramethydecane using the procedures of Examples 5D and E, respectively. The use of 1-bromo-4,4,8,8-tetramethyldecane in the procedure of Example 5F in place of 1-bromo-4,4,8,8-tetramethylnonane affords methyl 3,7,7,11,11 - pentamethyltridec-2-enoate. The use of ethyl but-2-ynoate in place of methyl but-2-ynoate yields ethyl 3,7,7,11,11-pentamethyltridec-2-enoate. The foregoing sequence of reactions is repeated with the exception of using each of 3-chloro-3-methylpentane, 3-chloro-3-ethylpentane, 3-chloro-3-ethylhexane, 4-chloro-4-methylheptane, 4-chloro-4-ethylheptane and 2-chloro-2-methylhexane in place t-amyl chloride to yield, as the final product of each methyl 3,7,7,11-tetramethyl-11-ethyltridec-2-enoate,
methyl 3,7,7-trimethyl-11,11-diethyltridec-2-enate,
methyl 3,7,7-trimethyl-11,11-diethyltetradec-2-enoate,
methyl 3,7,7,11-tetramethyl-11-(n-propyl)tetradec-2-enoate,
methyl 3,7,7-trimethyl-11-ethyl-11-(n-propyl)tetradec-2-enoate, and
methyl 3,7,7,11,11-pentamethylpentadec-2-enoate and the corresponding ethyl esters.

EXAMPLE 15

The procedure of Example 5F is used to react each of N,N-diethyl but-2-ynamide and methyl pent-2-ynoate with 1-bromo-4,4,8,8-tetramethyldecane yielding N,N-diethyl 3,7,7,11,11-pentamethyltridec-2-enamide and methyl 3-ethyl-7,7,11,11-tetramethyltridec-2-enoate.

EXAMPLE 16

The procedure of Example 1 is repeated with the exception of using each of t-amyl chloride and 3-chloro-3-methylpentane in place of t-butyl chloride to yield, first 3 - chloro - 3,6,6 - trimethyloctane and 3-chloro-3,6-dimethyl-6-ethyloctane and, second (using methyl magnesium bromide instead of ethyl magnesium bromide in Part D), 2-chloro-2,5,5-trimethylheptane and 2-chloro-2,5-dimethyl-5-ethylheptane. Each of the chlorides is used as the starting material in the process of Example 4 in place of 2-chloro-2,6,6-trimethylheptane to yield 4,7,7 - trimethyl - 4 - ethylnonan - 1 - ol, 4,7-dimethyl-4,7 - diethylnonan - 1-ol, 4,4,7,7-tetramethylnonan-1-ol and 4,4,7-trimethyl-7-ethylnonan-1-ol, each of which is treated with phosphorus tribromide to yield the corresponding C–1 bromides and phosphorus trichloride to yield the corresponding C–1 chlorides using the procedure of Example 2B or Example 5E (third paragraph). Each of 1-bromo-4,7,7-trimethyl-4-ethylnonane, 1-bromo-4,7-dimethyl-4,7-diethylnonane, 1-bromo-4,4,7,7-tetramethylnonane and 1-bromo-4,4,7-trimethyl-7-ethylnonane is used in the procedure of Example 5F in place of 1-bromo-4,4,8,8-tetramethylnonane to yield methyl 3,7,10,10-tetramethyl-7-ethyldodec-2-enoate, methyl 3,7,10-trimethyl-7,10 - diethyldodec - 2-enoate, methyl 3,7,7,10,10-pentamethyldodec-2-enoate and methyl 3,7,7,10-tetramethyl-10-ethyldodec-2-enoate.

EXAMPLE 17

By use of the procedure of Example 2 (first paragraph), 5-bromopentan-1-ol is converted into the t-butyl ether. The Grignard of 5-bromo-1-(t-butoxy)pentane is formed and reacted with t-butyl chloride and the product hydrolyzed with acid using the procedure of Example 2 (second paragraph) to yield 6,6-dimethylheptan-1-ol. The thus-obtained C–1 alcohol is converted into 1-bromo-6,6-dimethylheptane using the procedure of Example 2B. The C–1 bromide (1-bromo-6,6-dimethylheptane) is subjected to the procedures of Example 5 (Part D and the product used in Part E) to yield 4,4,9,9-tetramethyldecan-1-ol and then 1-bromo-4,4,9,9-tetramethyldecane.

By use of the procedure of Example 5F, 1-bromo-4,4,9,9-tetramethyldecane is converted into methyl 3,7,7,12,12-pentamethyltridec-2-enoate.

EXAMPLE 18

By use of the procedure of Example 3 (fourth paragraph), 6,6-dimethylheptan-1-ol is converted into 6,6-dimethylheptan-1-al which is reacted with methyl magnesium bromide to give 7,7-dimethyloctan-2-ol which is oxidized to 7,7-dimethyloctan-2-one using the procedure of Example 1, B and C, respectively. This ketone is reacted with methyl magnesium bromide to give 2,7,7-trimethyloctan-2-ol which is converted into 2-chloro-2,7,7-trimethyloctane by the procedure of Example 1 (D and E).

The C–2 chloride (2-chloro-2,7,7-trimethyloctane) is reacted with the Grignard of 4-bromo-1-(t-butoxy)butane using the procedure of Example 2 to yield the t-butyl ether of 5,5,10,10-tetramethylundecan-1-ol which is hydrolyzed to the C–1 alcohol and converted into 1-bromo-5,5,10,10-tetramethylundecane by the procedure of Example 2. The thus-obtained bromide is used in place of 1-bromo-4-ethyl-4,7,7-trimethyloctane in the procedure of Example 2C to yield methyl 3,8,8,13,13-pentamethyltetradec-2-enoate.

EXAMPLE 19

To 5,5-dimethylhexan-2-ol in ether is added phosphorus trichloride to yield 2-chloro-5,5-dimethylhexane using the procedure or Example 2B. By repeating the process of Example 4 with the exception of using 2-chloro-5,5-dimethylhexane in place of 2-chloro-2,6,6-trimethylheptane, there is obtained 4,7,7-trimethyloctan-1-al, 4,7,7-trimethyloctan-1-ol, 1-bromo-4,7,7-trimethyloctane and, as the final product, ethyl 3,7,10,10-tetramethylundec-2-enoate.

Similarly, by repeating the process steps of Example 4 with the exception of starting with 2-bromo-6,6-dimethylheptane in place of 2-chloro-2,6,6-trimethylheptane, there is obtained 4,8,8-trimethylnonan-1-al, 4,8,8-trimethylnonan-1-ol, 1-bromo-4,8,8-trimethylnonane and, as the final product, ethyl 3,7,11,11-tetramethyldodec-2-enoate. The chloride, 2-chloro-6,6-dimethylheptane, is prepared by treating 6,6-dimethylheptan-2-ol with phosphorus tribromide in benzene using the procedure of Example 5C (second paragraph).

EXAMPLE 20

N,N-diethyl but-2-ynamide is alkylated with the copper complex of each of 1-bromo-4,7,7-trimethyloctane and 1-bromo-4,8,8-trimethylnonane using the procedure of Example 5F to yield N,N-diethyl 3,7,10,10-tetramethylundec-2-enamide and N,N-diethyl 3,7,11,11-tetramethyldodec-2-enamide.

EXAMPLE 21

The procedure of Example 1A is repeated using t-amyl chloride to yield 4,4-dimethylhexan-1-al which is reacted with each of methyl magnesium bromide and ethyl magnesium bromide to yield 5,5-dimethylheptan-2-ol and 6,6-dimethyloctan-3-ol, respectively.

The alcohol, 5,5-dimethylheptan-2-ol is treated with phosphorus trichloride in benzene to afford 2-chloro-5,5-dimethylheptane which is used as the starting material in Example 4 in place of 2-chloro-2,6,6-trimethylheptane to yield 4,7,7-trimethylnonan-1-al, 4,7,7-trimethylnonan-1-ol, 1-bromo-4,7,7-trimethylnonane and, as the final product, ethyl 3,7,10,10-tetramethyldodec-2-enoate.

Similarly, the alcohol, 6,6-dimethyloctan-3-ol is reacted with phosphorus trichloride in benzene to afford 3-chloro-6,6-dimethyloctane which is used as the starting material in the process of Example 4 to yield 4-ethyl-7,7-dimethylnonan - 1-al, 4-ethyl-7,7-dimethylnonan-1-ol, 1-bromo-4-ethyl-7,7-dimethylnonane and, as the final product, ethyl 3,10,10-trimethyl-7-ethyldodec-2-enoate.

EXAMPLE 22

The tertiary halide, t-amyl chloride is reacted with the Grignard of 4-bromo-1-(t-butoxy)butane and the product hydrolyzed with acid using the procedure of Example 3 to yield 5,5-dimethylheptan-1-ol which is oxidized using chromic acid in pyridine to yield the aldehyde, 5,5-dimethylheptan-1-al. The aldehyde is reacted with methyl magnesium bromide to afford 6,6-dimethyloctan-2-ol which is converted into 2-chloro-6,6-dimethyloctane by treatment with phosphorus trichloride. By repeating the process steps of Example 4 with the exception of using 2-chloro-6,6-dimethyloctane as the starting compound in place of 2-chloro-2,6,6-trimethylheptane, there is obtained, 4,8,8 - trimethyldecan-1-al, 4,8,8-trimethyldecan-1-ol, 1-bromo-4,8,8-trimethyl decane and, as the final product, ethyl 3,7,11,11-tetramethyltridec-2-enoate.

EXAMPLE 23

Each of N,N-diethyl but-2-ynamide and methyl pent-2-ynoate is alkylated using the copper complex of each of 1-bromo-4,8,8 - trimethyldecane, 1-bromo-4-ethyl-7,7-dimethylnonane and 1-bromo-4,7,7-trimethylnonane following the procedure of Example 5F to yield N,N-diethyl 3,7,11,11-tetramethyltridec-2-enamide,
methyl 3-ethyl-7,11,11-trimethyltridec-2-enoate,
N,N-diethyl 3,10,10-trimethyl-7-ethyldodec-2-enamide,
methyl 3,7-diethyl-10,10-dimethyldodec-2-enoate,
N,N-diethyl 3,7,10,10-tetramethyldodec-2-enamide and
methyl 3-ethyl-7,10,10-trimethyldodec-2-enoate.

EXAMPLE 24

By use of the procedure of Example 10, each of the esters of Examples 13–19, 22 and 23 is reduced to the corresponding C–1 alcohol. For example, each of 3,7,7,11,11-pentamethyltridec-2-en-1-ol,
3,7,7,11-tetramethyl-11-ethyltridec-2-en-1-ol,
3,7,10,10-tetramethyl-7-ethyldodec-2-en-1-ol,
3,7,10,10-tetramethylundec-2-en-1-ol,
3,10,10-trimethyl-7-ethyldodec-2-en-1-ol and
3,7,11,11-tetramethyltridec-2-en-1-ol is obtained by the reduction of methyl 3,7,7,11,11-pentamethyltridec-2-enoate,
methyl 3,7,7,11-tetramethyl-11-ethyltridec-2-enoate,
methyl 3,7,7,10,10-tetramethyl-7-ethyldodec-2-enoate,
ethyl 3,7,10,10-tetramethylundec-2-enoate,
ethyl 3,10,10-trimethyl-7-ethyldodec-2-enoate and
ethyl 3,7,11,11-tetramethyltridec-2-enoate.

Esters and ethers of the C–1 alcohols are prepared according to the procedures of Examples 11 and 12.

EXAMPLE 25

A mixture of 1 g. of methyl 3,7,7,11,11-pentamethyldodec-2-enoate, 60 ml. of methanol, 0.2 g. of sodium carbonate and 6 ml. of water is stirred at about 30° for three hours. The mixture is diluted with water, neutralized and then extracted with ether. The organic extracts are combined, washed with water, dried over sodium sulfate and evaporated at room temperature to yield 3,7,7,11,11-pentamethyldodec-2-enoic acid which is purified by chromatography.

Using the above procedure, the other acid esters of the present invention can be converted into the free acid.

EXAMPLE 26

To a solution of 0.5 g. of 3,7,7,17,11-pentamethyldodec-2-enoic acid in 15 ml. of benzene, there is added with stirring one molar equivalent of potassium bicarbonate. The mixture is stirred until the evolution of carbon dioxide ceases and then the mixture is evaporaed to yield potassium 3,3,7,7,11,11 - pentamethyldodec - 2-enoate which can be purified by silica chromatography.

Alternatively, acid salts can be prepared by titrating the acid with an organic solution of the metal base, e.g. methanolic solution of sodium methoxide.

EXAMPLE 27

A mixture of methyl 3,7,7,11,11-pentamethyldodec-2-enoate (2 g.), 2.4 g. of benzyl alcohol, 0.1 g. of aluminum ethoxide and 0.2 g. of p-phenyldiamine is heated to 120° under nitrogen for eight hours. The methanol liberated by the reaction is removed by distillation. The residual reaction mixture is diluted with ether, the ethereal phase separated, washed with dilute sulfuric acid and water and evaporated to yield benzyl 3,7,7,11,11-pentamethyldodec-2-enoate.

By using other alcohols in the above procedure in place of benzyl alcohol, the corresponding esters are obtained.

Alternatively, acid esters can be prepared from the acid halide, e.g. acid chloride by treating the free acid with thionyl chloride and converting the acid halide to the ester by reaction with an alcohol for producing the ether desired.

EXAMPLE 28

(A) To a 15% solution of butyl lithium in hexane (420 ml.) is added at –10° with stirring, a solution of dry diethylamine (49 g.) in anhydrous ether (530 ml.). The mixture is then stirred for one hour at 20° to provide a one molar solution of diethylamino lithium.

An aliquot (50 ml.) of the thus-prepared solution is added to methyl 3,7,7,11,11-pentamethyldodec-2-enoate (12 g.) in ether (75 ml.) and the reaction mixture stirred for four hours at room temperature. The mixture is washed with aqueous 0.1 N hydrochloric acid solution and water, dried over sodium sulfate and evaporated to dryness to yield N,N - diethyl 3,7,7,11,11 - pentamethyldodec-2-enoate.

(B) By repeating the procedure of Part A with the exception of replacing diethylamine with an equivalent amount of each of ammonia, dimethylamine, ethylamine, aniline, diphenylamine, pyrrolidine, piperidine, morpholine, piperazine, 4-methylpiperazine and 2-methoxyethylamine, there is obtained 3,7,7,11,11-pentamethyldodec-2-enamide,
N,N-dimethyl 3,7,7,11,11-pentamethyldodec-2-enamide,
N-ethyl 3,7,7,11,11-pentamethyldodec-2-enamide,
N-phenyl 3,7,7,11,11-pentamethyldodec-2-enamide,
N,N-diphenyl 3,7,7,11,11-pentamethyldodec-2-enamide,
N,N-pyrrolidino 3,7,7,11,11-pentamethyldodec-2-enamide,
N,N-piperidino 3,7,7,11,11-pentamethyldodec-2-enamide,
N,N-morpholino 3,7,7,11,11-pentamethyldodec-2-enamide,
N,N-piperazino 3,7,7,11,11-pentamethyldodec-2-enamide,
N,N-(4'-methylpiperazino) 3,7,7,11,11-pentamethyldodec-2-enamide and
N-(2'-methoxyethyl) 3,7,7,11,11-pentamethyldodec-2-enamide.

Similarly, the other alkyl esters of the present invention can be converted into the corresponding 2-enamide using the procedure of Part A.

EXAMPLE 29

Compositions useful for the control of insects in accordance with the present invention are exemplified by the following which are applied by spraying. Parts by weight.

|     |                                                          | Parts |
| --- | -------------------------------------------------------- | ----- |
| (1) | Methyl 3,7,7,11,11-pentamethyldodec-2-enoate             | 3     |
|     | Sesame oil                                               | 97    |
| (2) | N,N-diethyl 3,7,7,11,11 - pentamethyl-dodec-2-en-amide   | 2     |
|     | Cottonseed oil                                           | 98    |
| (3) | Ethyl 3,7,7,10,10-pentamethyldodec-2-enoate              | 5     |
|     | Xylene                                                   | 95    |
| (4) | N,N-diethyl 3,7,10,10 - tetramethyldodec-2-enamide       | 2     |
|     | Xylene                                                   | 98    |

EXAMPLE 30

To a control of ten *Pyrrhocoris apterus* (5th instar larvae), there is applied 1 μl. of acetone and to a second group of ten, there is applied 1 μl. of acetone containing 1 μg. of methyl 3,7,7,11,11-pentamethyldodec-2-enoate. Three of the control group died and seven developed normally. All of the specimens of the second group failed to develop normally and died without reproducing.

What is claimed is:

1. A compound selected from those having the Formula A:

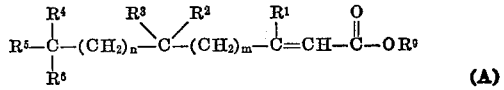

(A)

wherein, m is an integer of one to six;

n is an integer of two to six;

$R^2$ is hydrogen or lower alkyl;

each of $R^1$, $R^3$, $R^4$, $R^5$ and $R^6$ is lower alkyl; and $R^9$ is hydrogen, lower alkyl, benzyl or a metal, provided that when $R^1$ is methyl, $R^3$ is lower alkyl of one to four carbon atoms, each of $R^4$, $R^5$ and $R^6$ is methyl, m is the integer two or three and n is the integer two or three—then $R_2$ is lower alkyl.

2. A compound according to claim 1 wherein m is an integer of two to four and n is an integer of two to four.

3. A compound according to claim 2 wherein $R^9$ is lower alkyl.

4. A compound according to claim 2 wherein $R^9$ is lower alkyl; $R^2$ is hydrogen, methyl or ethyl; and each of $R^1$, $R^3$, $R^4$, $R^5$ and $R^6$ is methyl or ethyl.

5. A compound according to claim 3 wherein the configuration at C-2, 3 is trans.

6. A compound according to claim 4 wherein the configuration at C-2, 3 is trans.

7. A compound according to claim 6 wherein $R^9$ is ethyl.

8. The compound according to claim 4 wherein $R^9$ is ethyl; each of $R^1$, $R^2$, $R^3$, $R^4$, $R^5$ and $R^6$ is methyl; the configuration at C-2, 3 is trans; and each of $m$ and $n$ is the integer three.

9. The compound according to claim 4 wherein each of $R^1$, $R^2$, $R^3$, $R^4$, $R^5$, $R^6$ and $R^9$ is methyl; the configuration at C-2, 3 is trans; and each of $m$ and $n$ is the integer three.

10. A compound according to claim 1 wherein $R^9$ is ethyl; each of $R^1$, $R^2$, $R^3$, $R^4$, $R^5$ and $R^6$ is methyl; $m$ is the integer one; $n$ is the integer three; and the configuration at C-2, 3 is trans.

11. A compound according to claim 4 wherein $R^2$ is hydrogen; each of $R^1$, $R^3$, $R^5$ and $R^6$ is methyl, $R^4$ is ethyl; and each of $m$ and $n$ is three.

12. A compound according to claim 11 wherein $R^9$ is ethyl.

13. A compound according to claim 4 wherein $R^2$ is methyl or ethyl.

References Cited

Chemical Abstracts, vol. 52, 11783b (1958).
Chemical Abstracts, vol. 71, 78,549w (1969).

LEWIS GOTTS, Primary Examiner

D. G. RIVERS, Assistant Examiner

U.S. Cl. X.R.

260—410, 410.5, 413, 247.2 A, 268 C, 294 A, 294.3 E, 326.3, 345.8, 347.4, 404, 468 R, 468 B, 471 R, 473 A, 476 R, 482 R, 484 A, 484 R, 486 R, 487, 488 H, 31.2 R, 31.2 MR, 345.9, 347.8, 438.1, 593 R, 601 R, 654, 665 G, 596; 252—56 A; 424—312, 315